(12) United States Patent
Brown

(10) Patent No.: US 11,019,142 B2
(45) Date of Patent: *May 25, 2021

(54) PROXIMITY BASED PLAYLIST MERGING

(71) Applicant: International Business Machines Corporation, Armonk, NY (US)

(72) Inventor: Michael Sean Brown, Wahroonga (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,398

(22) Filed: Aug. 21, 2018

(65) Prior Publication Data
US 2018/0359316 A1 Dec. 13, 2018

Related U.S. Application Data

(63) Continuation of application No. 14/991,138, filed on Jan. 8, 2016, now Pat. No. 10,097,632.

(51) Int. Cl.
| | |
|---|---|
| *H04L 29/08* | (2006.01) |
| *H04L 29/06* | (2006.01) |
| *H04W 8/00* | (2009.01) |
| *G06F 21/10* | (2013.01) |
| *G06F 16/438* | (2019.01) |
| *H04W 4/80* | (2018.01) |

(52) U.S. Cl.
CPC ...... *H04L 67/1095* (2013.01); *H04L 65/4084* (2013.01); *H04W 8/005* (2013.01); *G06F 16/4387* (2019.01); *G06F 21/10* (2013.01); *H04W 4/80* (2018.02)

(58) Field of Classification Search
CPC ........... H04L 67/1095; H04L 65/4084; H04W 8/005; H04W 8/80; G06F 16/10; G06F 16/27; G06F 16/4387; G06F 21/10; G06F 11/2056; H04N 21/472
USPC ......................................................... 709/219
See application file for complete search history.

(56) References Cited

U.S. PATENT DOCUMENTS

| | | | |
|---|---|---|---|
| 6,192,340 B1 * | 2/2001 | Abecassis | G10H 1/0058 455/185.1 |
| 6,748,395 B1 * | 6/2004 | Picker | G06Q 30/0209 |

(Continued)

FOREIGN PATENT DOCUMENTS

WO 2011157891 A1 12/2011

OTHER PUBLICATIONS

Lee, J. "Use Music Pool To Broadcast Music Across Multiple Devices [Android]", retrieved from http://www.makeuseof.com/tag/use-music-pool-to-broadcast-music-across-multiple-devices-android/; Mar. 2013.

(Continued)

*Primary Examiner* — John A Follansbee
*Assistant Examiner* — James N Fiorillo
(74) *Attorney, Agent, or Firm* — Brown & Michaels, PC; Christopher Pignato

(57) ABSTRACT

Merging media in a playlist associated with a cloud based media provider of a first mobile device of a first user with media being played on a second mobile device of a second user within a specific proximity, such that the second mobile device receives at least a portion of a media playlist of the first user from the cloud based media provider for merging with the media currently being played by the second device.

15 Claims, 6 Drawing Sheets

(56) References Cited

U.S. PATENT DOCUMENTS

| | | | | |
|---|---|---|---|---|
| 7,689,705 | B1* | 3/2010 | Lester | H04L 65/4076 709/231 |
| 7,853,712 | B2* | 12/2010 | Amidon | G06F 16/4387 709/231 |
| 8,250,120 | B2 | 8/2012 | Quinn | |
| 8,281,027 | B2* | 10/2012 | Martinez | H04W 4/02 709/231 |
| 8,539,523 | B2* | 9/2013 | Philpott | G06Q 30/02 725/32 |
| 8,606,948 | B2* | 12/2013 | Evans | H04L 67/1095 709/230 |
| 8,782,712 | B2* | 7/2014 | Mehta | H04N 21/4825 725/61 |
| 9,501,479 | B2* | 11/2016 | Ferguson, Jr. | G06F 16/4387 |
| 2006/0268667 | A1* | 11/2006 | Jellison, Jr. | G06F 16/4393 369/30.08 |
| 2008/0091717 | A1 | 4/2008 | Garbow et al. | |
| 2008/0162655 | A1* | 7/2008 | Khedouri | G06F 16/635 709/206 |
| 2009/0006542 | A1* | 1/2009 | Feldman | G06F 16/4387 709/203 |
| 2009/0222392 | A1* | 9/2009 | Martin | G06F 16/437 706/46 |
| 2010/0063993 | A1* | 3/2010 | Higgins | G06Q 10/10 709/203 |
| 2010/0070917 | A1* | 3/2010 | Gates | G06F 16/634 715/810 |
| 2010/0228803 | A1* | 9/2010 | Quinn | G06F 16/4387 707/808 |
| 2011/0082902 | A1* | 4/2011 | Rottler | G06F 16/4387 709/204 |
| 2011/0161409 | A1* | 6/2011 | Nair | G06F 8/38 709/203 |
| 2012/0117026 | A1* | 5/2012 | Cassidy | G06F 16/4387 707/634 |
| 2012/0117221 | A1* | 5/2012 | Katpelly | H04N 21/4135 709/224 |
| 2012/0290648 | A1* | 11/2012 | Sharkey | G06F 16/40 709/204 |
| 2013/0011025 | A1* | 1/2013 | Liu | H04W 12/06 382/118 |
| 2013/0031216 | A1* | 1/2013 | Willis | G06Q 50/01 709/219 |
| 2013/0325807 | A1* | 12/2013 | Sokolov | G06F 16/178 707/638 |
| 2013/0332532 | A1* | 12/2013 | Bernhardsson | G06F 16/48 709/204 |
| 2014/0025836 | A1* | 1/2014 | Gupta | H04N 21/8456 709/231 |
| 2014/0281973 | A1* | 9/2014 | Klappert | G06F 3/01 715/716 |
| 2015/0058367 | A1* | 2/2015 | Brull | G06F 16/335 707/754 |
| 2015/0074240 | A1 | 3/2015 | Klein, Jr. et al. | |
| 2015/0161360 | A1* | 6/2015 | Paruchuri | H04N 21/2743 726/27 |
| 2015/0244825 | A1* | 8/2015 | Albanese | H04L 67/2857 709/219 |
| 2015/0269158 | A1* | 9/2015 | Panguluri | G06F 16/4387 707/803 |
| 2016/0156687 | A1* | 6/2016 | Leung | H04W 4/80 709/219 |
| 2016/0261658 | A1* | 9/2016 | Taylor | H04L 65/4076 |

OTHER PUBLICATIONS

"Merge Contents Between iDevices", retrieved from http://www.imobie.com/guide/anytrans/merge-contents-between-devices.htm; as early as May 2012.

Chen, Z. "What a Juke! A Collaborative Music Sharing System", World of Wireless, Mobile and Multimedia Networks (WoWMoM), 2012 IEEE International Symposium on a Date of Conference: Jun. 25-28, 2012.

Gaye et al. "Mobile Music Technology: Report on an Emerging Community", International Conference on New Interfaces for Musical Expression; 2006.

* cited by examiner

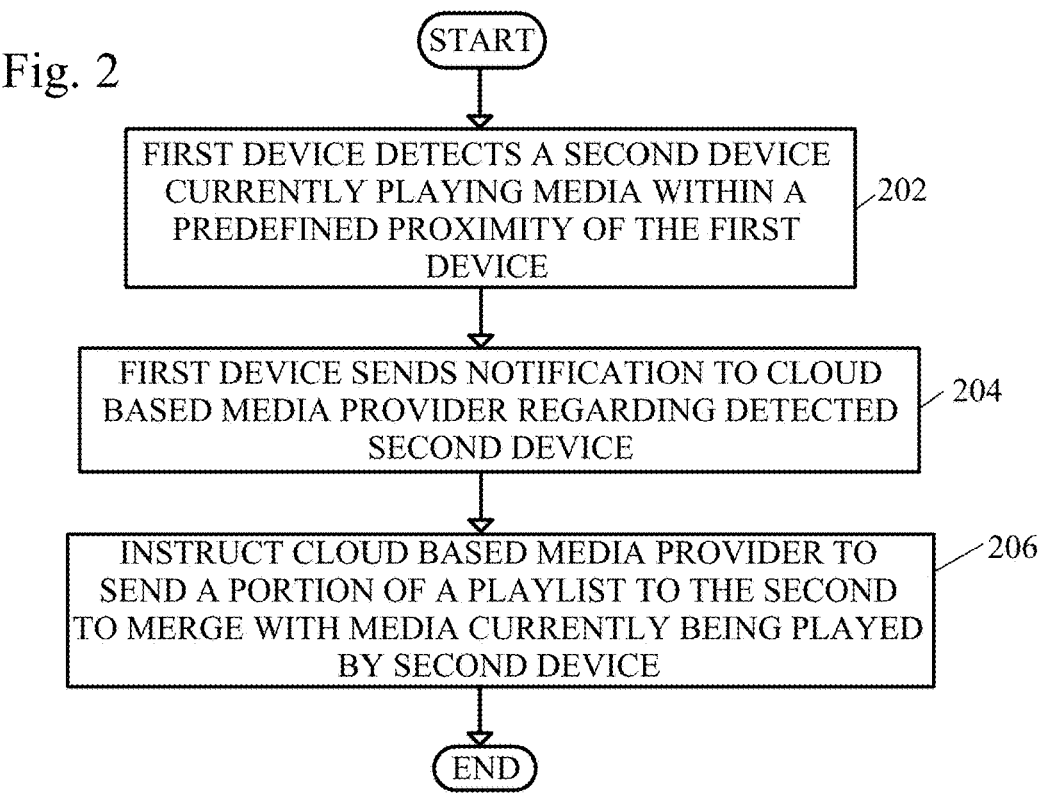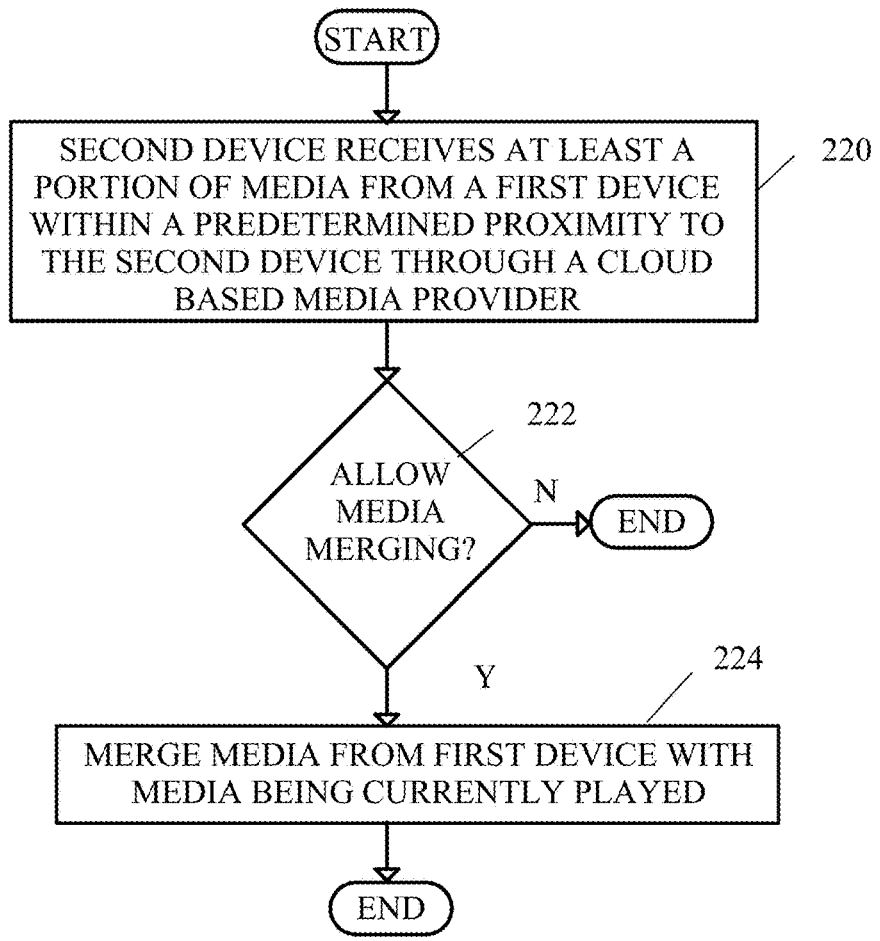

PROXIMITY BASED PLAYLIST MERGING

BACKGROUND

The present invention relates to media playlists, and more specifically to merging of media playlists within a location.

People use their mobile devices to consume media such as audio, video or photographs using online services. Through the online or "cloud based" services, a user can play a playlist which is defined as predetermined list of digital files. The playlist is preferably stored online. Through the online services, the media of the playlist may be played from any location and from multiple devices subscribed to the online service. Users can also create shared cloud based playlists, or create collaborative playlists that multiple users can update and play as subscribers to the online service.

Alternatively, users may establish a playlist with media that is present or residing in a repository or storage of the device itself.

In a confined space users are generally confined to listening to audio from one device, and one playlist, unless headphones are worn. For example, in a motor vehicle, if the driver has his or her device paired to the car audio system, the music playing will be based on playlists or songs available on that device or service of the user paired to the car audio system.

SUMMARY

According to one embodiment of the present invention, a method of merging media in a playlist associated with a cloud based media provider of a first mobile device of a first user with media being played on a second mobile device of a second user within a specific proximity is disclosed. The method comprising the steps of a computer of the first mobile device: detecting a second mobile device located within a predefined proximity to the first mobile device which is currently playing media; sending a notification to the cloud based media provider regarding the second mobile device; and instructing the cloud based media provider to send at least a portion of a media playlist of the first user to the second device through the cloud based media provider for merging with the media currently being played by the second device.

According to another embodiment of the present invention, a computer program product for merging media in a playlist associated with a cloud based media provider of a first mobile device of a first user with media being played on a second mobile device of a second user within a specific proximity is disclosed. The computer program product comprising a computer of the first mobile device comprising at least one processor, one or more memories, one or more computer readable storage media, the computer program product comprising a computer readable storage medium having program instructions embodied therewith. The program instructions executable by the computer to perform a method comprising: detecting, by the computer, a second mobile device located within a predefined proximity to the first mobile device which is currently playing media; sending, by the computer, a notification to the cloud based media provider regarding the second mobile device; and instructing, by the computer, the cloud based media provide to send at least a portion of a media playlist of the first user to the second device through the cloud based media provider for merging with the media currently being played by the second device.

According to another embodiment of the present invention, a computer system for merging media in a playlist associated with a cloud based media provider of a first mobile device of a first user with media being played on a second mobile device of a second user within a specific proximity is disclosed. The computer system comprising a computer of a first mobile device comprising at least one processor, one or more memories, one or more computer readable storage media having program instructions executable by the computer to perform the program instructions comprising: detecting, by the computer, a second mobile device located within a predefined proximity to the first mobile device which is currently playing media; sending, by the computer, a notification to the cloud based media provider regarding the second mobile device; and instructing, by the computer, the cloud based media provide to send at least a portion of a media playlist of the first user to the second device through the cloud based media provider for merging with the media currently being played by the second device.

BRIEF DESCRIPTION OF THE DRAWINGS

FIG. 2 shows a flow diagram of a method of merging playlists associated with a cloud based media provider of a first device with a second device within a specific proximity.

FIG. 3 shows a flow diagram of a method of a second device receiving media for merging with currently playing media.

DETAILED DESCRIPTION

First device and second device may each be mobile device or one of the devices may be a mobile device. In one embodiment, the first and second devices each have access to a cloud based media provider. In an alternate embodiment, the first device has access to a cloud based media provider and the second device does not.

Figure 1:
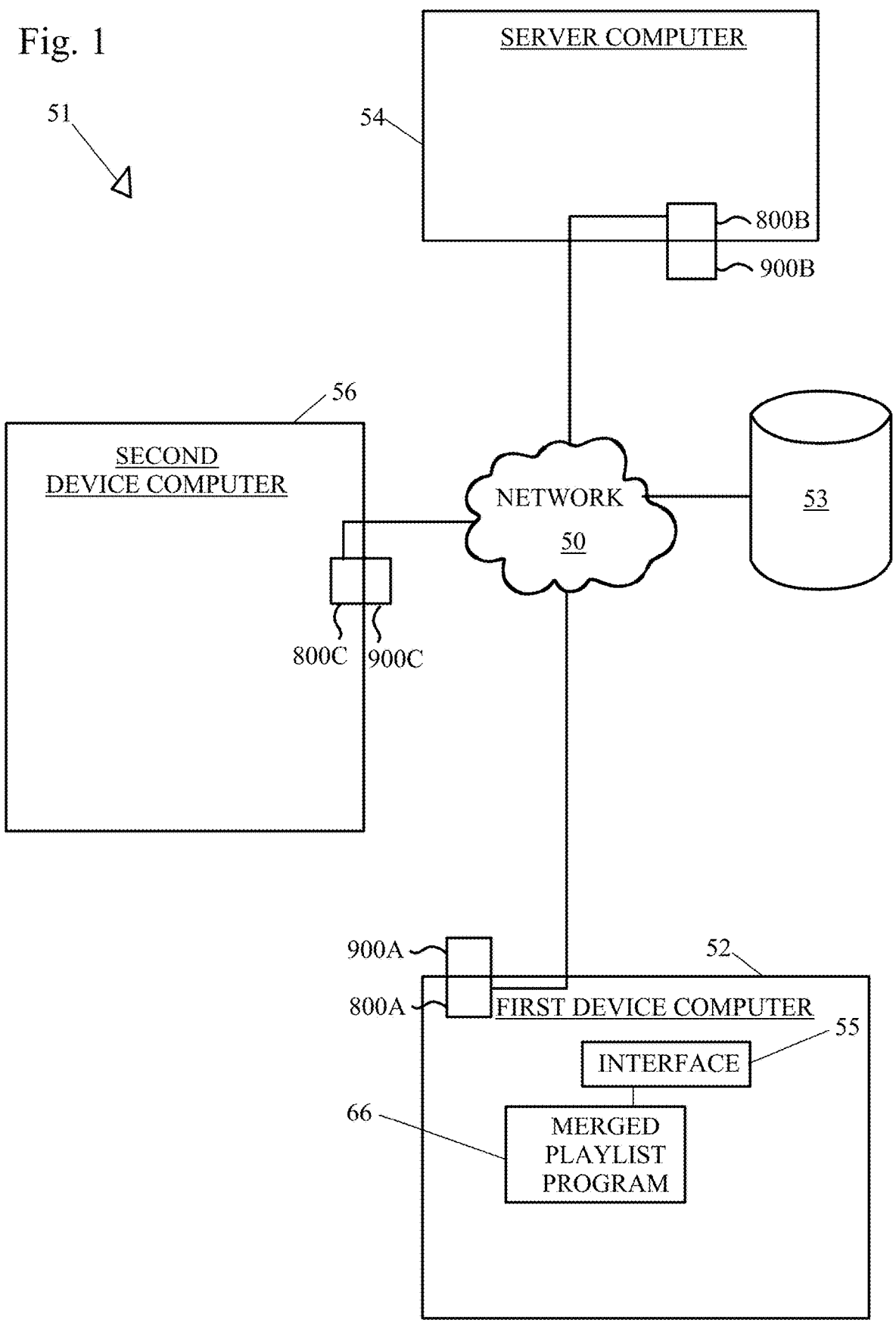
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a first client computer 52, a second client computer 56, storage unit 53, and server computer 54 connect to network 50. In other exemplary embodiments, network data processing system 51 may include additional client computers, storage devices, server computers, and other devices not shown.

Figure 7:
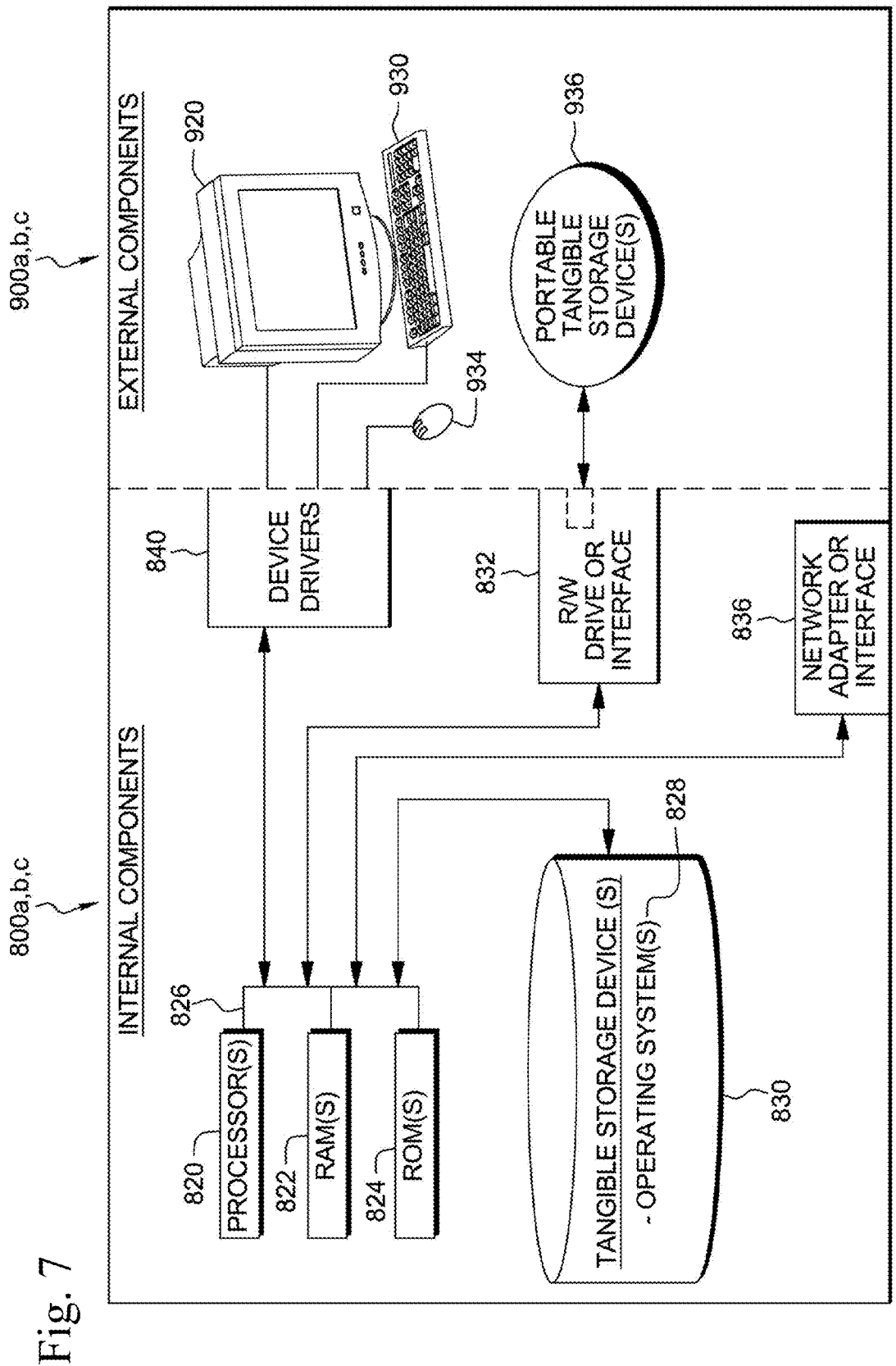
FIG. 7 illustrates internal and external components of a client computer and a server computer in which illustrative embodiments may be implemented.

The first client computer 52 includes a set of internal components 800a and a set of external components 900a, further illustrated in FIG. 7. The first client computer 52 may be, for example, a mobile device, a cell phone, a personal digital assistant, a netbook, a laptop computer, a tablet computer, or any other type of computing device.

The first client computer 52 may contain an interface 55. Through interface 55, users may view and establish media playlists through a cloud based media provider. Interface may accept commands and data entry from a first user, such as input for a media playlists. Interface 55 can be, for example, a command line interface, a graphical user interface (GUI), or a web user interface (WUI). The first client computer may include a merged playlist program 66.

The second client computer 56 includes a set of internal components 800c and a set of external components 900c, further illustrated in FIG. 7. The second client computer 56 may be, for example, a mobile device, a cell phone, a personal digital assistant, a netbook, a laptop computer, a tablet computer, or any other type of computing device.

The second client computer 56 may contain an interface. Through the interface, users may view media playlists and current media being played. The interface may accept commands and data entry from a second user, such as a percentage of media accepted from another device. The interface can be, for example, a command line interface, a graphical user interface (GUI), or a web user interface (WUI). While not shown, the second client computer may also contain the merged playlist program 66.

Server computer 54 includes a set of internal components 800b and a set of external components 900b illustrated in FIG. 7. Server computer 54 may contain an interface. The interface can be, for example, a command line interface, a graphical user interface (GUI), or a web user interface (WUI).

In the depicted example, server computer 54 may provide information to the first and second client computers 52, 56. Server computer 54 can compute the information locally or extract the information from other computers on network 50.

Program code and programs such as merged playlist program 66 may be stored on at least one of one or more computer-readable tangible storage devices 830 shown in FIG. 7, on at least one of one or more portable computer-readable tangible storage devices 936 as shown in FIG. 7, or on storage unit 53 connected to network 50, or may be downloaded to a computer, such as first client computer 52, second client computer 56, or server computer 54, for use. For example, program code and programs such as merged playlist program 66 may be stored on at least one of one or more storage devices 830 on server computer 54 and downloaded to first client computer 52 and/or second client computer 56 over network 50 for use on the first client computer 52 or the second client computer 56. Alternatively, server computer 54 can be a web server, and the program code, and programs such as merged playlist program 66 may be stored on at least one of the one or more storage devices 830 on server computer 54 and accessed on the first client computer 52 and/or the second client computer 56. In other exemplary embodiments, the program code, and programs such as merged playlist program 66 may be stored on at least one of one or more computer-readable storage devices 830 on first client computer 52, second client computer or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 shows a flow diagram of a method of merging playlists associated with a cloud based media provider of a first mobile device with a second mobile device within a specific proximity.

In a first step, a first device of a first user detects a second device of a second user within a predefined proximity which is currently playing media (step 202). The detection of the second device may be by wireless detection, a discovery mode or app on a wireless device, wireless Internet (Wi-Fi), unique BlueTooth® or wireless Internet signature detection of the second device, location or proximity services such as GPS based location, through BlueTooth® technology, or by touching the mobile devices together with near field communication (NFC) activated.

The media may include video, photographs, music, or a combination of both. The predetermined proximity may be, for example a 15 foot radius around the first device. The predetermined proximity may also be varied by the second user and/or second device.

The first device sends a notification to a cloud based media provider used by the first user, regarding the second device (step 204). In one embodiment, the notification includes information regarding which cloud media provider the first device and second device are subscribed to. The notification may also include whether the subscription of the first user allow a guest to have access to the cloud based media provider. The notification may also include whether any agreements present between different cloud based media providers, for example if the first user of the first device and the second user of the second device are subscribed to different cloud based media providers.

The first device instructs the cloud based media provider to send at least a portion of the first user's playlist of media to the second device through the cloud based media provider, so that the second user's device can merge media from the playlist sent by the first user with the media being played by the second device (step 206).

The sending of at least a portion of the first user's playlist of media to the second device may take place through the Internet, NFC, BlueTooth® or other communication means. It should be noted that the merging of media may take place for a time period based on the first device continuing to be in a predetermined proximity of the second device.

FIG. 3 shows a flow diagram of a method of a second device receiving media for merging with currently playing media.

A second device within a predetermined proximity to a first device receives at least a portion of media from the first device through a cloud based media provider (step 220).

If the user of the second device allows media merging (step 222), media from the first device, sent through the cloud based media provider, is merged with the media currently being played by the second device (step 224) and the method ends. In a preferred embodiment, the percentage of the media currently being played by the second device which is sent from the first device is limited to a predetermined value which may be set by a user of the second device. Other limits may also be imposed, for example based on genre, tempo, publication date, subject etc. . . . which are characteristics of the media itself.

If the user of the second device does not allow media merging (step 222), the method ends. A notification may send to the first device to indicate the failure or unacceptance of media merging.

Figure 4:
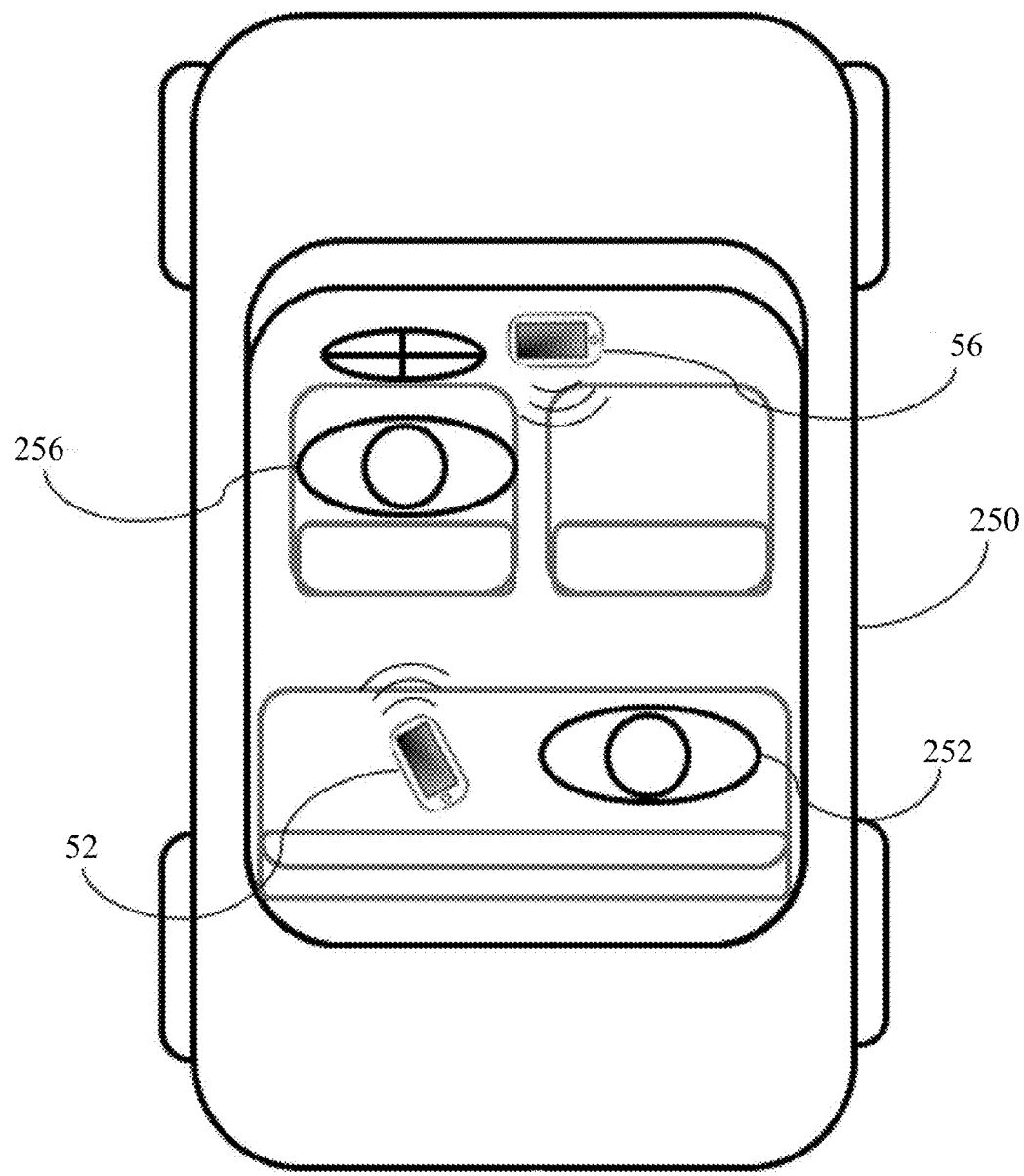
FIG. 4 shows a schematic of a car and associated mobile devices.

For example, in a confined space, such as car 250, and as shown in FIG. 4, the first device computer 52 of a first user 252, which may be a mobile device or the car stereo, detects a second device computer 56 of a second user 256, which may also be a mobile device. The second device is currently playing music. The first mobile device 52 detects the second mobile device 56 through NFC. The first mobile device, having detecting the second mobile device, sends a notification to a cloud based media provider, for example Pandora®. The first mobile device instructs the media provider to send a portion of the first user's playlist to the second mobile device to be merged with the currently playing music. The music being played by the second mobile device will now include music from the first user's playlist.

The second user might have set parameters in the second mobile device to limit the amount of music which should be accepted from outside sources, for example 25% of the current playlist. In such an example, the second mobile device would accept music from the cloud based media provider until the amount of music reached 25% of the second user's music.

In another example, a first user may be at a party where a second user is playing music. The first user discovers the second user's mobile device, and merges music from a cloud based media provider to the second device. The merged music may be set to remain on the second user's device for a specific amount of time, for example a time in which the party is to run.

Figure 5:
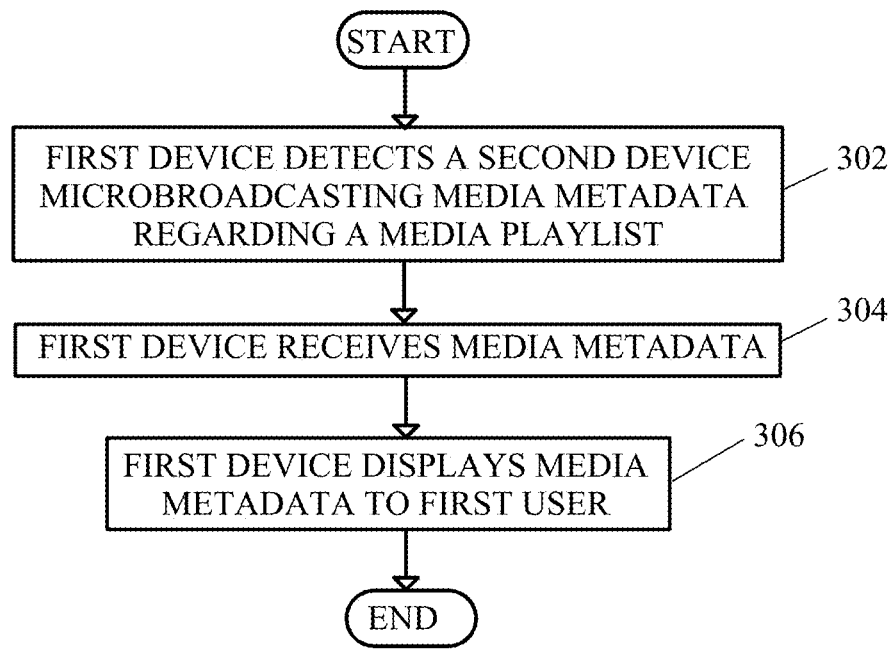
FIG. 5 shows a flow diagram of a method of a first device receiving metadata regarding media being microbroadcasted from a second device.

In an alternate embodiment, a first device may receive metadata regarding a playlist of media which is being broadcasted by a second device. Referring to FIG. 5, in a first step, a first device detects a second device microbroadcasting metadata regarding a media playlist (step 302), for example by the merged playlist program 66. The first device receives media metadata being microbroadcast by the second device (step 304). The first device then displays media metadata to the first user (step 306), for example by the merged playlist program 66, and the method ends.

It should be noted that after the first device displays the media metadata to the first user, the first user may choose to play/display the media through a cloud based media provider in which the first user subscribes. Alternatively, if the cloud based media provider in which the first user subscribes does not contain the chosen media, other media providers may be associated with the media metadata.

Figure 6A:
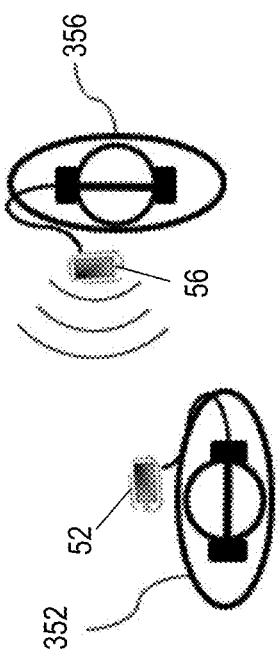
FIGS. 6a-6b show a schematic of a first user moving towards a location of a second user and associated mobile device which is microbroadcasting metadata regarding a playlist.
Figure 6B:
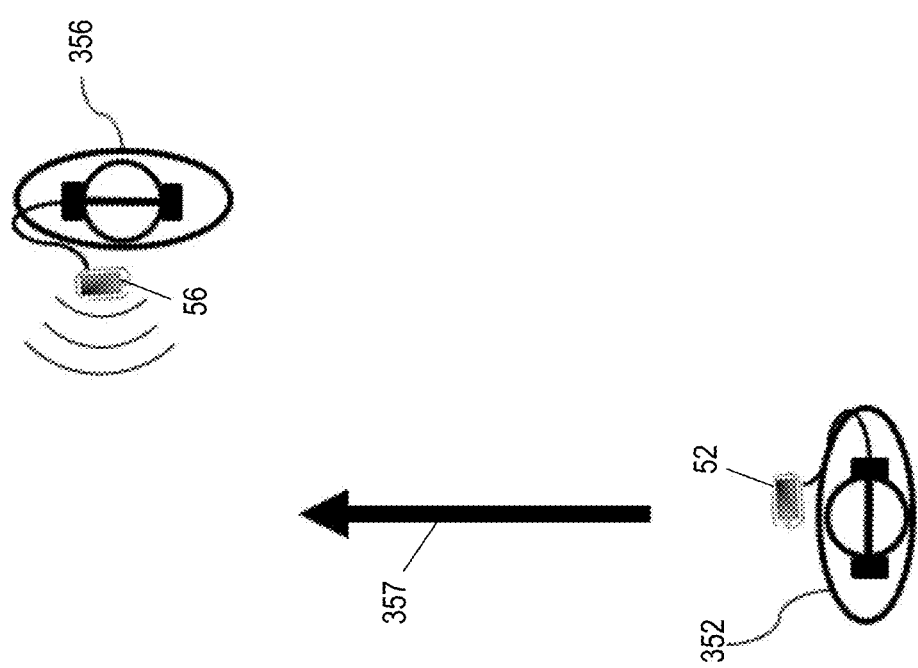

For example, a first user 352 is traveling towards (indicated by arrow 357) a second user 356 as shown in FIG. 6*a*. When the first user's mobile device 52 comes within range of the second user's mobile device 56 microbroadcasting a media playlist, as shown in FIG. 6*b*, the first mobile device 52 receives the media playlist metadata being microbroadcasted and displays the metadata to the first user 352 through the first mobile device 52. The metadata of the media playlist being broadcasted may include, for example a movie list or a music list which is includes metadata such as title of the media, running time of the media, provider of the media, likability rating of the media, or other metadata. The first user may use the metadata of the media playlist to add media to their own playlist for viewing/listening.

FIG. 7 illustrates internal and external components of a first client computer 52, a second client computer 56, and server computer 54 in which illustrative embodiments may be implemented. In FIG. 7, first client computer 52, server computer 54, and second client computer 56 include respective sets of internal components 800*a*, 800*b*, 800*c* and external components 900*a*, 900*b*, 900*c*. Each of the sets of internal components 800*a*, 800*b*, 800*c* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, merged playlist program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b*, 800*c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Merged playlist program 66 can be stored on at least one of one or more of the portable computer-readable tangible storage devices 936, read via R/W drive or interface 832 and loaded into hard drive 830.

Each set of internal components 800*a*, 800*b*, 800*c* also includes a network adapter or interface 836 such as a TCP/IP adapter card. Merged playlist program 66 can be downloaded to first client computer 52, second client computer 56, and server computer 54 from an external computer via a network (for example, the Internet, a local area network or other, wide area network) and network adapter or interface 836. From the network adapter or interface 836, merged playlist program 66 is loaded into hard drive 830. The network may comprise copper wires, optical fibers, wireless transmission, routers, firewalls, switches, gateway computers and/or edge servers.

Each of the sets of external components 900*a*, 900*b*, 900*c* includes a computer display monitor 920, a keyboard 930, and a computer mouse 934. Each of the sets of internal components 800*a*, 800*b*, 800*c* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Merged playlist program 66 can be written in various programming languages including low-level, high-level, object-oriented or non object-oriented languages. Alternatively, the functions of merged playlist program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of merging media in a playlist associated with a cloud based media provider of a first mobile device of a first user with media being played on a second mobile device of a second user within a specific proximity comprising the steps of a computer of the first mobile device:
   detecting a second mobile device located within a pre-defined proximity to the first mobile device which is currently playing media;
   sending a notification to the cloud based media provider regarding the second mobile device, wherein the notification includes information regarding which cloud based media provider that the first mobile device and the second mobile device are subscribed to, and wherein if the first mobile device and the second mobile device are subscribed to different cloud based media providers, identifying agreements between the different cloud based media providers that will enable the merging of media between the first mobile device and the second mobile device; and
   upon receiving verification that the second mobile device will accept the merging of media, instructing the cloud based media provider to send at least a portion of a media playlist of the first user to the second device through the cloud based media provider for merging with the media currently being played by the second device, creating a merged playlist on the second device, wherein:
   the portion of the media playlist of the first user that is sent is limited to a pre-determined value which is set by the second user; and
   the creation of the merged playlist is subject to at least one of one or more conditions or limits set by the second user based on characteristics of the media, wherein the characteristics of the media include at least one of genre, tempo, publication date or subject.

2. The method of claim 1, wherein the merging of the media with media currently being played by the second device is temporary.

3. The method of claim 2, wherein the temporary merging is based on proximity of the first device with the second device.

4. The method of claim 2, wherein the temporary merging is based on an allotted time period.

5. The method of claim 1, wherein the percentage of the first user's media playlist received is based on characteristics of the media.

6. A computer program product for merging media in a playlist associated with a cloud based media provider of a first mobile device of a first user with media being played on a second mobile device of a second user within a specific proximity comprising a computer of the first mobile device comprising at least one processor, one or more memories, one or more computer readable storage media, the computer program product comprising a computer readable storage medium having program instructions embodied therewith, the program instructions executable by the computer to perform a method comprising:
   detecting, by the computer, a second mobile device located within a predefined proximity to the first mobile device which is currently playing media;
   sending, by the computer, a notification to the cloud based media provider regarding the second mobile device wherein the notification includes information regarding which cloud based media provider that the first mobile device and the second mobile device are subscribed to, and wherein if the first mobile device and the second mobile device are subscribed to different cloud based media providers, identifying agreements between the different cloud based media providers that will enable the merging of media between the first mobile device and the second mobile device; and
   upon receiving verification that the second mobile device will accept the merging of media, instructing, by the computer, the cloud based media provide to send at least a portion of a media playlist of the first user to the second device through the cloud based media provider for merging with the media currently being played by the second device, creating a merged playlist on the second device, wherein:
   the portion of the media playlist of the first user that is sent is limited to a pre-determined value which is set by the second user; and
   the creation of the merged playlist is subject to at least one of one or more conditions or limits set by the second user based on characteristics of the media, wherein the characteristics of the media include at least one of genre, tempo, publication date or subject.

7. The computer program product of claim 6, wherein the merging of the media with media currently being played by the second device is temporary.

8. The computer program product of claim 7, wherein the temporary merging is based on proximity of the first device with the second device.

9. The computer program product of claim 7, wherein the temporary merging is based on an allotted time period.

10. The computer program product of claim 6, wherein the percentage of the first user's media playlist received is based on characteristics of the media.

11. A computer system for merging media in a playlist associated with a cloud based media provider of a first mobile device of a first user with media being played on a second mobile device of a second user within a specific proximity comprising a computer of a first mobile device comprising at least one processor, one or more memories, one or more computer readable storage media having program instructions executable by the computer to perform the program instructions comprising:
   detecting, by the computer, a second mobile device located within a predefined proximity to the first mobile device which is currently playing media;
   sending, by the computer, a notification to the cloud based media provider regarding the second mobile device, wherein the notification includes information regarding which cloud based media provider that the first mobile device and the second mobile device are subscribed to, and wherein if the first mobile device and the second mobile device are subscribed to different cloud based media providers, identifying agreements between the different cloud based media providers that will enable the merging of media between the first mobile device and the second mobile device; and
   upon receiving verification that the second mobile device will accept the merging of media, instructing, by the computer, the cloud based media provide to send at least a portion of a media playlist of the first user to the second device through the cloud based media provider for merging with the media currently being played by the second device, creating a merged playlist on the second device, wherein the creation of the merged playlist is subject to at least one of one or more conditions or limits set by the second user based on characteristics of the media, wherein the characteristics of the media include at least one of genre, tempo, publication date or subject.

12. The computer system of claim 11, wherein the merging of the media with media currently being played by the second device is temporary.

13. The computer system of claim 12, wherein the temporary merging is based on proximity of the first device with the second device.

14. The computer system of claim 12, wherein the temporary merging is based on an allotted time period.

15. The computer system of claim 11, wherein the second device receives a percentage of the first user's media playlist.

\* \* \* \* \*